United States Patent [19]

Iwata et al.

[11] Patent Number: 4,847,538

[45] Date of Patent: Jul. 11, 1989

[54] ELECTRONIC FLASH EQUIPMENT

[75] Inventors: Hiroshi Iwata, Ikoma; Shinji Hirata, Toyonaka, both of Japan

[73] Assignee: West Electric Company, Ltd., Osaka, Japan

[21] Appl. No.: 89,003

[22] Filed: Aug. 19, 1987

Related U.S. Application Data

[63] Continuation of Ser. No. 766,004, Aug. 15, 1985, abandoned.

[30] Foreign Application Priority Data

Aug. 18, 1984 [JP] Japan ................................ 59-171897
Aug. 18, 1984 [JP] Japan ................................ 59-171898

[51] Int. Cl.[4] ............................................ H04B 41/14
[52] U.S. Cl. ................................ 315/241 P; 315/151
[58] Field of Search ................ 315/241 P, 241 S, 151; 354/145.1, 415, 416; 363/26

[56] References Cited

U.S. PATENT DOCUMENTS

| | | | |
|---|---|---|---|
| 3,846,811 | 11/1974 | Nakamura et al. | 315/241 P |
| 4,184,756 | 1/1980 | Land et al. | 315/241 P |
| 4,258,294 | 3/1981 | Yamasaki | 315/241 P |

OTHER PUBLICATIONS

SCR Manual Including Triacs and Other Thyristors, Sixth Edition, General Electric, pp. 1–5.

*Primary Examiner*—Benedict V. Safourek
*Assistant Examiner*—T. Salindong
*Attorney, Agent, or Firm*—Cushman, Darby & Cushman

[57] ABSTRACT

Electronic flash equipment in the present including a Field Effect Transistor which is connected to a flash tube in series and a voltage control structure which controls the conductivity of the Field Effect Transistor by control of a voltage across the gate and the source of the Field Effect Transistor. A automatic light control and a high frequency repeating flash light radiation are realized by control of the voltage.

22 Claims, 9 Drawing Sheets

ELECTRONIC FLASH EQUIPMENT

This is a continuation of application Ser. No. 766,004 filed Aug. 15, 1985 which was abandoned upon the filing hereof.

BACKGROUND OF THE INVENTION

1. Field of the Technology:

The present invention relates to electronic flash equipment for photography, and particularly to an improvement in a part for time control of light radiation of an electronic flash tube.

2. Description of the Prior Art:

When there is not enough light to take a photograph, e.g., in a dark interior or in the evening or night, electronic flash equipment is widely used to provide enough light to an object. For this purpose, electronic flash equipment which has various functions is developed and is practically used.

One of these functions is to detect a reflected light from the object, and the light which is applied to the object is automatically controlled to an adequate value based on this detected light. In such an automatic light controlled electronic flash equipment, as is well known, there are two methods to control light. One method, named a series type, stops discharge of a main capacitor during flashing. The other method, named a parallel type, bypasses the electric energy charged in the main capacitor to another element instead of the flash tube during flashing.

A circuit of a conventional series type automatic light controlled electronic flash equipment is shown in FIG. 1, wherein a flash light tube 2 is connected to a SCR 3 in series. The electric charge of the main capacitor 1 is supplied to the flash light tube 2 which is excited by a trigger circuit 4, and the flash light tube 2 radiates the light toward the object.

The reflected light out of the object is detected by a light detector 8. When the detected light reaches a predetermined value, the light detector 8 triggers a SCR 9 and turns it on. Since a capacitor 5 is connected to ground through the SCR 9, this capacitor 5 is charged and an electric potential of an anode of the SCR 3 is pulled down. Upon application of inverse voltage across the anode and the cathode of the SCR 3, the SCR 3 turns off, and the light radiation is stopped.

In this conventional electronic flash, as is shown in FIG. 2, after the sum of the reflected light from the object reached the predetermined value at the time T, it is desireable for the light radiation to stop immediately. However, the light radiation of the flash light tube does not vanish completely, because the current from the main capacitor 1 continues to flow through the flash light tube 2, the capacitor 5 and the SCR 9, for a period after the time T. As a result, the flash light tube 2 radiates unnecessary light during an above-mentioned period. Thus, the sum of the applied light to the object exceeds the adequate value for photography. This surplus part of the light is shown by hatching in FIG. 2.

Furthermore, in case that the flash light equipment is used to repeatedly radiate the flash light within short intervals, a time constant which produced by the capacitor 5, resistor 6 and 7 must be short enough in order to completely turn off the SCR 3 at every flash radiation. If the resistor 6 is of a small value, the SCR 9 will not turn off.

In case the focusing in a camera is very difficult due to darkness of scenery, there is a method to illuminate the object by repeated flashing of a flash light. The electronic flash equipment in accordance with this method has a small auxiliary subcapacitor for charging with the electric energy, whereby the repeated flash lights are radiated by the cyclic triggering of the flash tube. An amount of the radiated light depends on the capacitance of the capacitor and the charging voltage. In the abovementioned prior art, the relation between the capacitance of the subcapacitor, charging voltage and the period of the trigger circuit must be sufficiently accurately adjusted in respective suitable values. However such adjustment is very difficult because the amount of the light is minute the capacitance of the capacitor is too small in order to decrease the charging time. In case that the capacitance is too large, the charging time become longer, and hence cyclic time of the trigger circuit must be longer. Furthermore, recently a small dry battery, such a UM-3 type, is usually used as the power source. These small dry-cell batteries have a little electric energy, and when the dry battery is consumed, the time which is required to charge the capacitor becomes longer. On the other hand, if the cyclic time of the trigger circuit does not change by the exhaustion of the dry battery, the flash light equipment will be operated by a lower charging voltage, and the amount of the light necessary to observe the object will not be obtained.

SUMMARY OF THE INVENTION

An object of the present invention is to realize an electronic flash equipment which is improved in the abovementioned defect in the prior art.

Electronic flash equipment in accordance with the present invention comprises:

a power source, a main capacitor for charging an electric energy of the power source, a flash tube for flash light radiation by consumption of the charged electric energy of the main capacitor, a field effect transistor connected to a discharging circuit with the main capacitor through the flash tube and for controlling the radiation of flash light, a voltage control means for controlling an operation of the field effect transistor by controlling a voltage applying to a gate of the field effect transistor comprising:

a voltage regulator for stabilizing an output voltage of the power source, a control voltage generation circuit including a switching means for applying an output of the voltage regulator to a dividing means for dividing the output voltage of the voltage regulator and for issuing a divided output of the voltage regulator by the dividing means and for applying the divided output to the field effect transistor, an operation control circuit for applying an operational input signal to the switching means for controling the switching means, a trigger switch circuit for triggering the operation control circuit.

DESCRIPTION OF THE PREFERRED EMBODIMENTS

Figure 1:
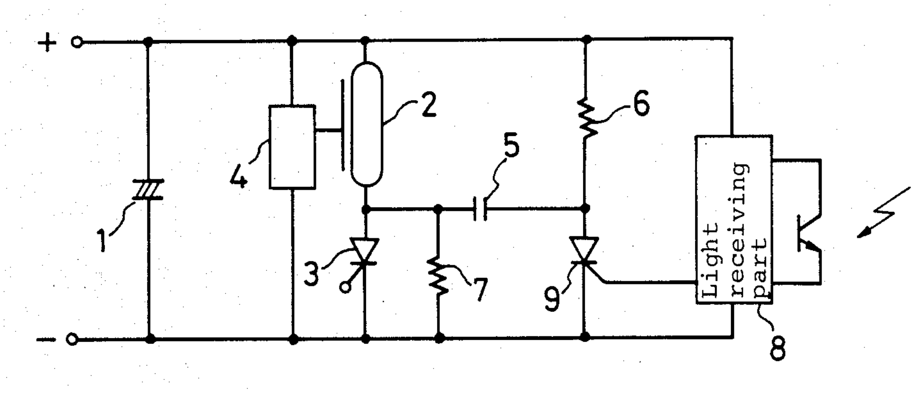
FIG. 1 is a drawing showing a circuit diagram of an automatic electronic light controlled flash equipment in a prior art.
Figure 2:
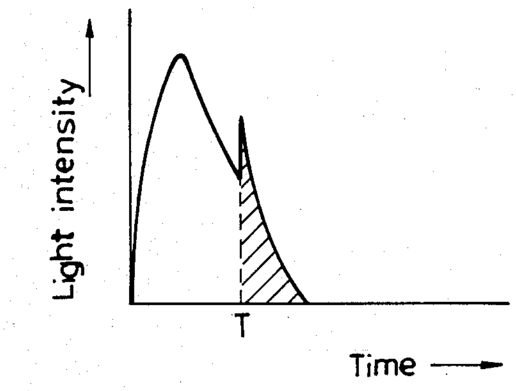
FIG. 2 is a drawing showing a light intensity corresponding a time in the automatic light controlled flash equipment in the prior art.
Figure 3:
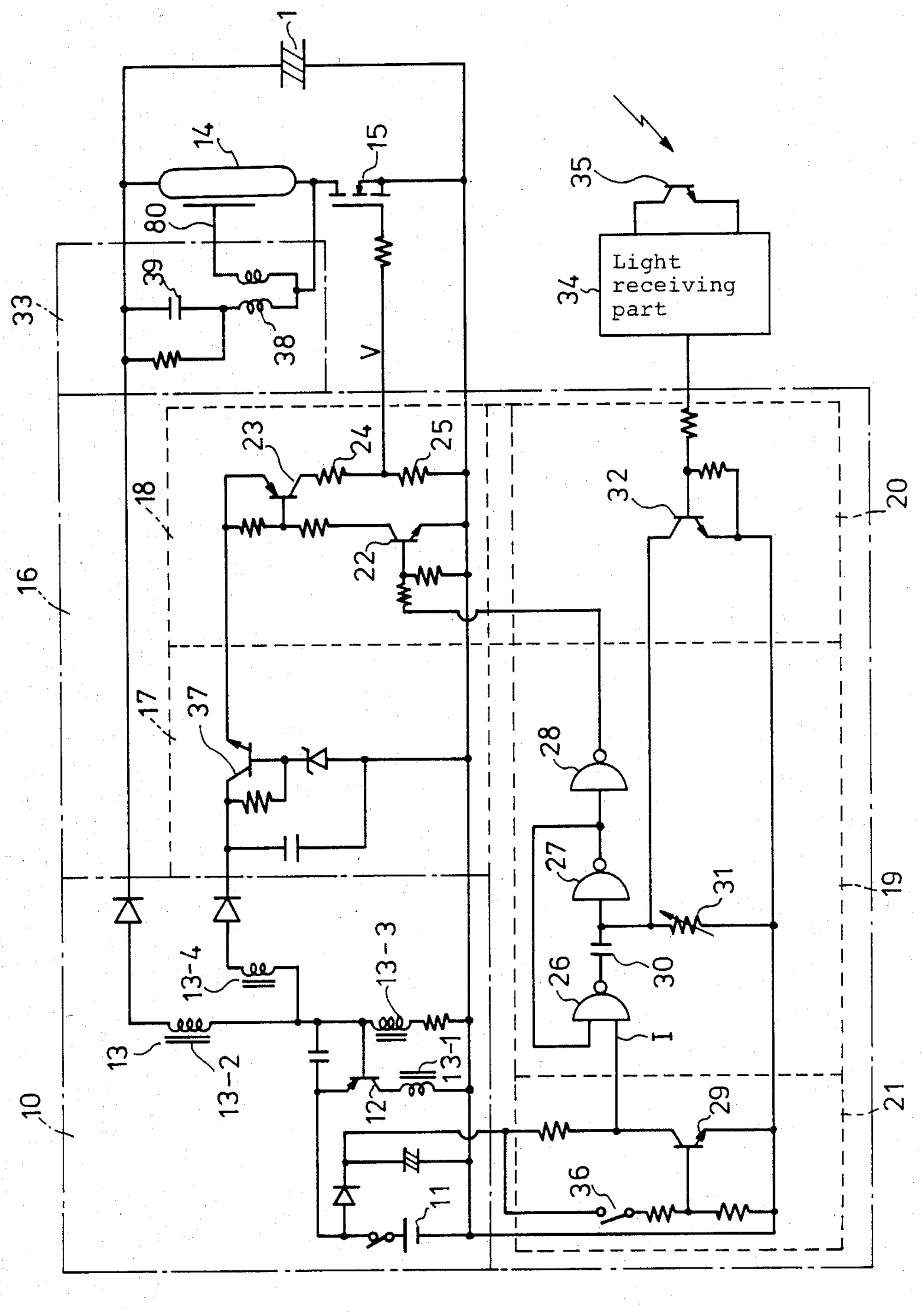
FIG. 3 is a circuit diagram of a first embodiment of the present invention showing an electronic flash equipment with an automatic light control function.

FIG. 3 is a circuit diagram of a first embodiment of the present invention showing an electronic flash equipment with an automatic light control function.

A DC—DC converter 10 comprises an oscillation transformer 13 which has a primary coil 13-1, a secondary coil 13-2, an auxiliary coil 13-3 and an output coil 13-4, and an oscillation transistor 12 or the like, whereby a low voltage of a DC power source 11 is converted to a high voltage. A flash tube 14 radiates flash light by the electric energy charged in a main capacitor 1. A field effect transistor (hereafter referred to a "FET") 15 is connected to the flash tube 14 in series. A voltage control means 16 controls the input voltage of the FET 15. Trigger circuit 33 excites the flash tube 14. A light receiving part 34 receives a reflected light from an object, and when the amount of the received light reaches a predetermined value, a signal to stop the light radiation is applied to the voltage control means 16. The voltage control means 16 comprises a constant voltage generation circuit 17, a control voltage generation circuit 18 which is connected to FET 15, an operation control circuit 19 which controls voltage generation circuit 18, a control operation interruption circuit 20 and a starting switch circuit 21.

Figure 4:
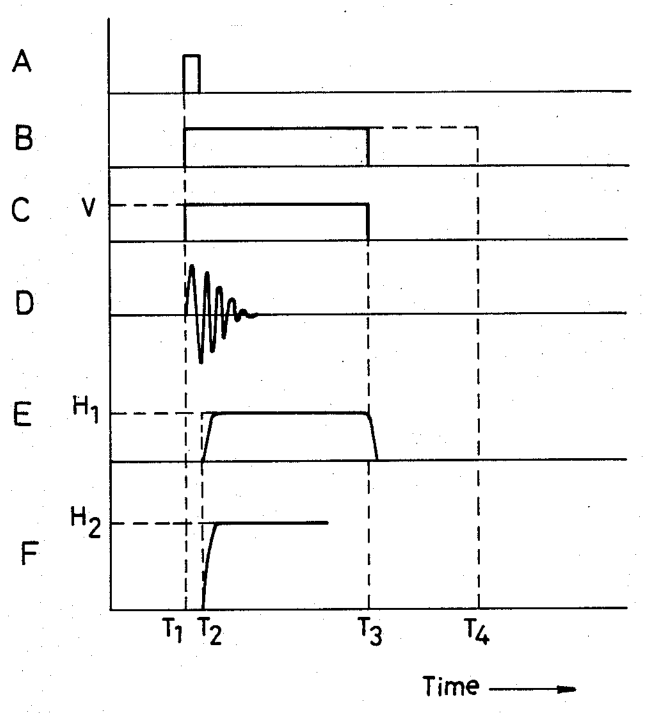
FIG. 4 is a timing chart showing the operation of the first embodiment of the present invention.

The operation of the above-mentioned first embodiment is elucidated by the timing chart shown in FIG. 4. The oscillation transistor 12 of the DC—DC converter 10 starts oscillation when the power switch is closed. An output voltage is issued at the secondary coil 13-2 and the output coil 13-4. The high voltage output of the secondary coil 13-2 is rectified by a diode and charges the main capacitor 1. A constant voltage output which is stabilized by a Zener diode is issued from an emitter of the transistor 37 of the constant voltage generation circuit 17. In this state, when the switch 36 of the trigger switch circuit 21 is closed at the time $T_1$ as is shown in FIG. 4A, a transistor 29 comes into a conductive state, causing the the input terminal I of a NAND gate 26 to become a L level, and the output level of the NAND gate 26 becomes H level. A pulse signal which is determined by a time constant of a capacitor 30 and a resistor 31 is issued and applied to a NAND gate 28 through the NAND gate 27. Then, an output signal is issued from the NAND gate 28 as is shown in FIG. 4B, and is applied to the control voltage generation circuit 18. The maximum period $T_4$-$T_1$ of the output signal of the NAND gate 28 is adjusted to be greater than or equal to the period wherein the charged electric energy in the main capacitor 1 perfectly discharges through the flash tube 14, by means of the adjustment of the time constant of the capacitor 30 and the resistor 31.

The transistor 22 is brought to the conductive state by the output of the NAND gate 28, and furthermore, the transistor 23 turns to conductive state. The voltage V, which is divided by the resistors 24 and 25 and is issued at the common terminal between resistors 24 and 25, is applied across the gate and the source of the FET 15, as is shown in FIG. 4C, and the FET comes into conductive state. Thereby, a trigger current flows through the trigger capacitor 39 and a primary coil of a trigger transformer 38 of the trigger circuit 33, and a trigger signal is issued from the secondary coil of the trigger transformer 38 as is shown in FIG. 4D and is applied to a trigger electrode 80. The flash tube 14 is excited by the trigger signal applied to the trigger electode 80, at the time $T_2$ as shown in FIG. 4E. The charged electric energy in the main capacitor 1 discharges through the flash tube l4 and the FET 15, and flash tube 14 radiates the light to the object as is shown in FIG. 4E.

The reflected light from the object is received by a receiving device 35 of the light receiving part 34. When the sum of the received light reaches a predetermined value at the time $T_3$, the flash light interruption signal is applied to the voltage control means 16 from the light receiving part 34. Initially the transistor 32 turns to a conductive state, and since both terminals of the resistor 31 are shortcircuited, the output of the NAND gate 28, and the output of the transistor 23 as shown in FIG. 4C become zero, since the transistors 22, 23 of the control voltage generation circuit 18 both turn to nonconductive state. As a result the voltage across the resistor 25 become zero as shown in FIG. 4B, and the FET 15 turns to the nonconductive state, causing the flash light tube to 14 stop the light radiation at the time of $T_3$ in FIG. 4. Therefore, the period of the light radiation of the flash tube 14 becomes that from $T_2$ to $T_3$ as shown in FIG. 4E. In the case when the ratio between the resistor 24 and 25 is changed to increase the voltage at both terminals of the resistor 25, the current which flows through the FET 15 increases and the flash tube 14 radiates the light with the peak value $H_2$ as shown in FIG. 4F, which is stronger than the peak value $H_1$ as is shown in FIG. 4E. On the contrary, in case that the voltage across the resistor 25 decreases, the flash tube 14 can radiate the light with a lower peak value. Furthermore, the trigger circuit 33 is operated by the charge current of the capacitor 39 in accordance with the switchover to the conductive state of the FET 15.

Figure 5:
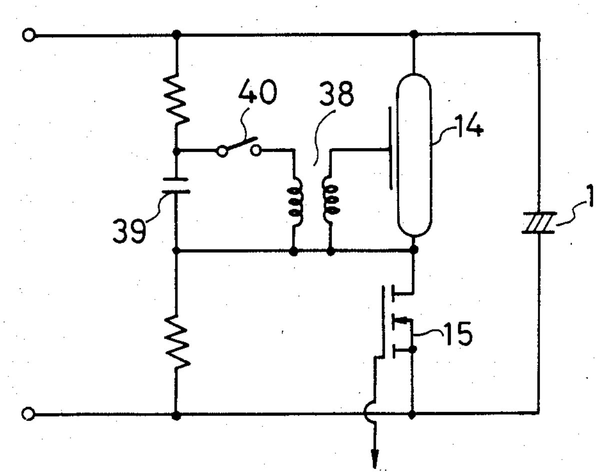
FIG. 5 is a circuit diagram of another example of a trigger circuit of the first embodiment.

On another method, as is shown in FIG. 5, the trigger circuit is operated by the discharge of the capacitor 39, which is charged in advance. In this method, if the trigger switch 40 is formed linked with the switch 36 of the trigger switch circuit 21, the switch 40 is simultaneously closed by the closure of the switch 36 and the charge of the trigger capacitor 39 is discharged through the primary coil of the trigger transformer 38. The high voltage trigger output is issued at the secondary coil and excites the flash tube 14. Though the low voltage battery and the DC—DC converter are used as the power source in this embodiment, of course, a high voltage piled battery can be used as well.

Figure 6:
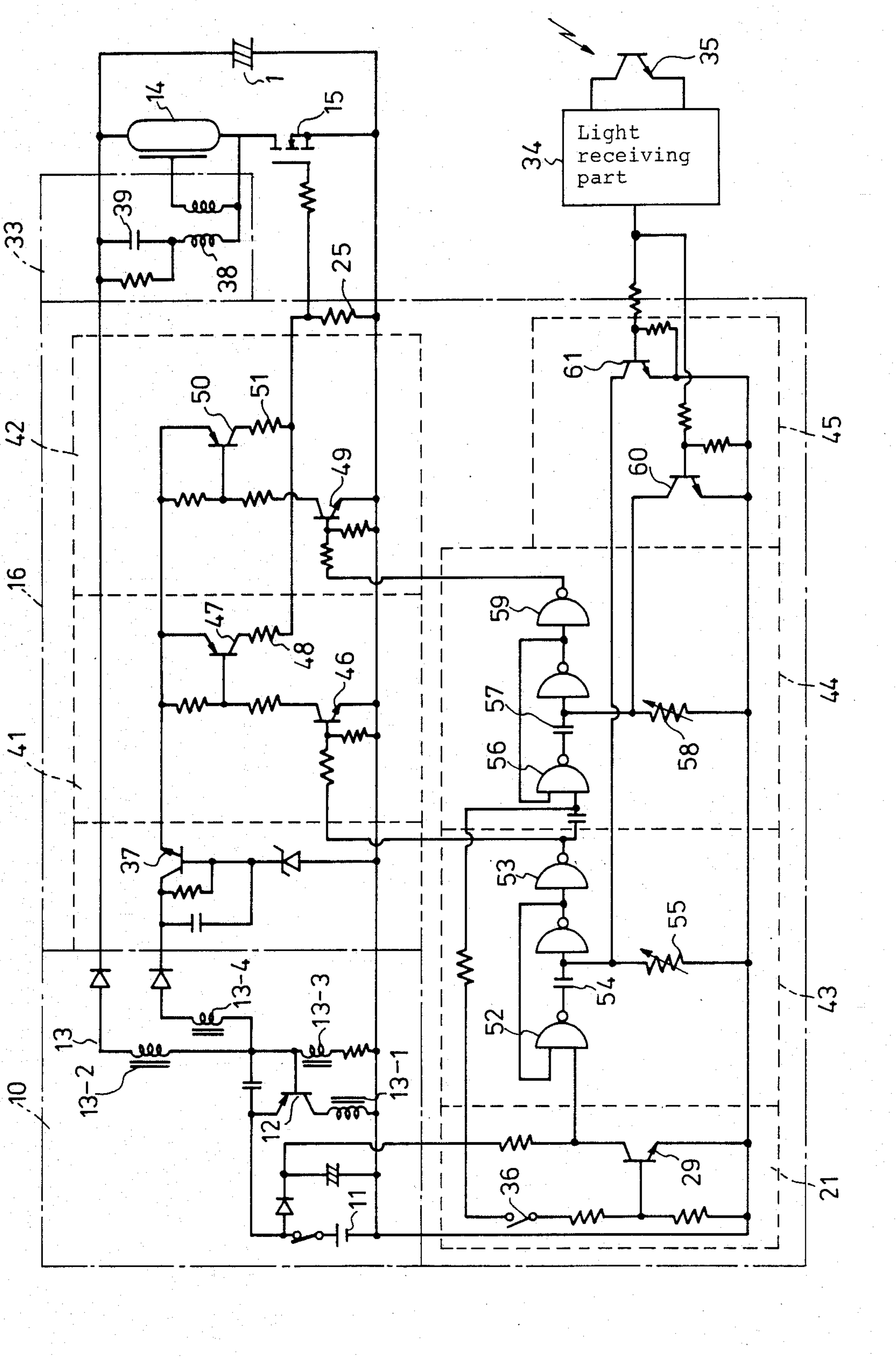
FIG. 6 is a circuit diagram of a second embodiment of the present invention showing an electronic flash equipment with an automatic light control function.

The circuit diagram of a second embodiment of the electronic flash equipment with the automatic light control function in accordance with the present invention is shown in FIG. 6. In this embodiment, the control voltage generation circuit 18 in the first embodiment is constituted by a first control voltage generation circuit 41 and a second control voltage generation circuit 42 in a manner that control signals of different voltages from each other are generated and applied across the gate and the source of the FET 15. Furthermore, this embodiment is provided with a first operation control circuit 43 for controlling the first control voltage generation circuit 41 and a second operation control circuit 44 for controlling the second control voltage generation circuit 42, respectively. A control stopping circuit 45 for controlling the operation control circuits 43, 44 is controlled by a light radiation stop signal from the light receiving part 34, and stops the operation of the first operation control circuit 43 and the second operation control circuit 44.

In this second embodiment, the parts and circuit corresponding to those of the first embodiment are designated by the same numerals and they have the same or similar function, therefore superposed statement of the operations is omitted.

Figure 7:
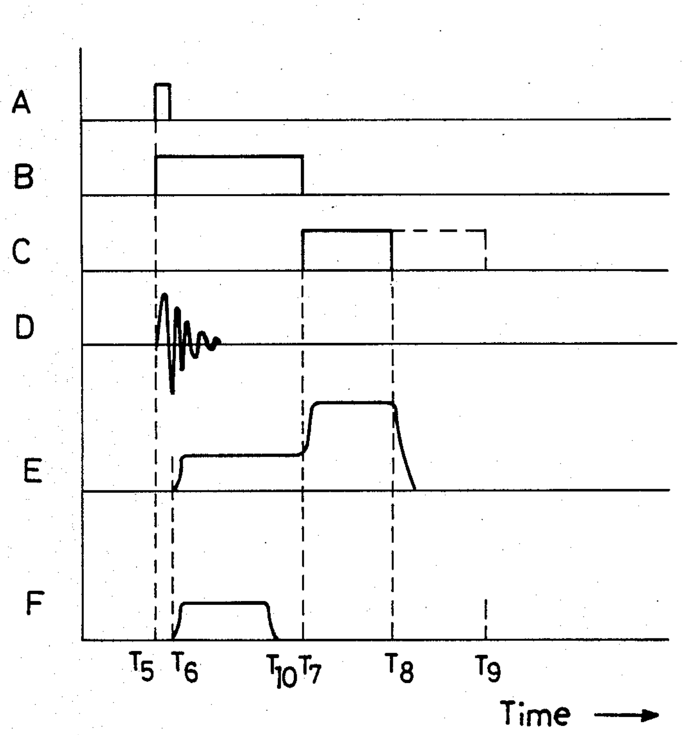
FIG. 7 is a timing chart showing the operation of second embodiment in the present invention.

The operation of the second embodiment is shown in the timing chart of FIG. 7. In the state that the main capacitor 1 is charged by the power source through the DC—DC converter 10, by closing of the switch 36 in the trigger switch circuit 21 at the time $T_5$ as shown in FIG. 7A, the transistor 29 turns to conductive state, and the output of the NAND gate 52 of the first operation control circuit 43 turns on H level. The output signal of the NAND gate 53 in accordance with the time constant of the capacitor 54 and resistor 55 is shown in FIG. 7B. This output signal is applied to the first control voltage generation circuit 41, and the transistor 46 turns to conductive state, causing the transistor 47 to turn to conductive state. As a result, a voltage in accordance with the ratio of the resistances 25 and 48 arises across the resistor 25, and this voltage is applied across the gate and the source of the FET 15. As a result, the FET 15 turns to conductive state, and the trigger pulse issues from the triggr circuit 33 as shown in FIG. 7D. Thereby the flash tube 14 is excited, and the flash light is radiated toward the object by the charged electric energy in the main capacitor 1 during the time of $T_6$ as shown in FIG. 7E. Then, the output of the first operation control circuit 43 turns to L level from H level at the time $T_7$ as shown in FIG. 7B, and the operation of the first control voltage generating circuit 41 stops.

When the output of the NAND gate 56 of the second operation control circuit 44 turns to H level, equally to the above-mentioned operation of the first operation control circuit 43, an output voltage in accordance with the time constant of the capacitor 57 and the resistor 58 is issued from a NAND circuit 59 at the time $T_7$ as shown in FIG. 7C. Then, by this output, the transistor 49 of the second control voltage generating circuit 42 turns to conductive state, and furthermore the transistor 50 turns to conductive state. On the other hand, since the output signal of the NAND gate 53 disappears at the time $T_7$, the transistors 46 and 47 turn to nonconductive state. The voltage in accordance with the ratio of the resistors 51 and 25 is issued across both terminals of the resistor 25, and a voltage which is different from the one of the first control voltage generating circuit 41 is applied across the gate and the source of the FET 15. For example, by increasing the voltage across both terminals of the resistor 25 in accordance with the ratio of the resistance 51 and 25 is higher than the voltage across both terminals of the resistor 25 in accordance with the ratio of the resistor 48 and 25, more current can flow through the FET 15. Accordingly, the flash light tube 14 radiates more intense light after the time $T_7$ as shown in FIG. 7E. The radiated light from the flash light tube 14 is applied to the object from the start of the flash at the time $T_6$ as shown in FIG. 7E. The reflected light from the object is received by the light receiving part 34, and when the sum of the received light reached the predetermined value at the time $T_8$, the light radiation interruption signal is issued to the control operation stop circuit 45 from the light receiving part 34, and the transistor 60 becomes to conductive state by this light radiation interruption signal. As a result, the output of the second operation control circuit 43 turns on "L" level at the time $T_8$ as is shown in FIG. 7C since the both terminals of the resistor 58 is shortcircuited. Accordingly, the transistors 49, 50 turn to nonconductive state. Since the voltage of the both terminals of the resistor 25 becomes zero, the FET 15 turns to nonconductive state. Therefore, the light radiation from the flash light tube 14 finishes at the time $T_8$ as shown in FIG. 7E.

When the sum of the light which is received by the light receiving part 34 reaches to the predetermined value at the time $T_{10}$ before time $T_7$ which is an operation starting time of the second operation control circuit 44 and the second control voltage generation circuit 42, the transistors 60, 61 are caused to become conductive by the light radiation interruption signal from the light receiving part 34. Thereby the resistors 55, 58 are shortcircuited, and, as a result, as mentioned above, the voltage across both terminals of the resistor 25 becomes zero, and the light radiation of the flash tube 14 is interrupted at the time $T_{10}$ as shown in FIG. 5F.

Figure 8:
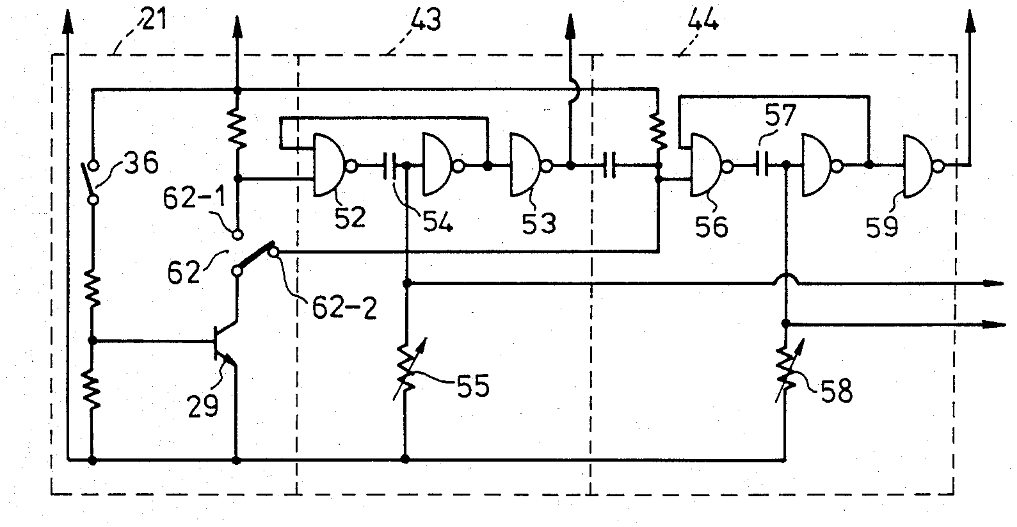
FIG. 8 is a circuit diagram of a third embodiment of the present invention showing an electronic flash equipment with an automatic light control function.

The third embodiment of the present invention is shown by the circuit diagram as shown in FIG. 8.

The trigger switch circuit 21 of the third embodiment comprises a switch 62 which selects one of the operations of the first and the second operation control circuit 43, 44. The rest of the circuits are same to that of the second embodiment. This embodiment is elucidated along the time chart of FIG. 9 as follows.

For example, in case that the switch 62 selects the position of 62-1, the operation is almost the same as the second embodiment. As is shown in FIG. 9A, when the switch 36 was closed at the time $T_{11}$, as mentioned above, the output signal with the time width from $T_{11}$ to $T_{13}$ is issued from the NAND gate 53 of the first operation control circuit 43 as shown in FIG. 9B. As a result, the flash tube 14 radiates the flash light with the low peak value $H_3$ until the time $T_{13}$, and after the time $T_{13}$, the output signal which is shown in FIG. 9D is issued. Thereby, the flash tube 14 radiates a flash light with the high peak value $H_4$ as shown in FIG. 9E.

When the sum of the received light on the light receiving part 34 which receives the reflected light from the object reached to the predetermined value at the time $T_{14}$, the resistor 55 is shortcircuited and the light radiation of the flash tube terminates.

Figure 9:
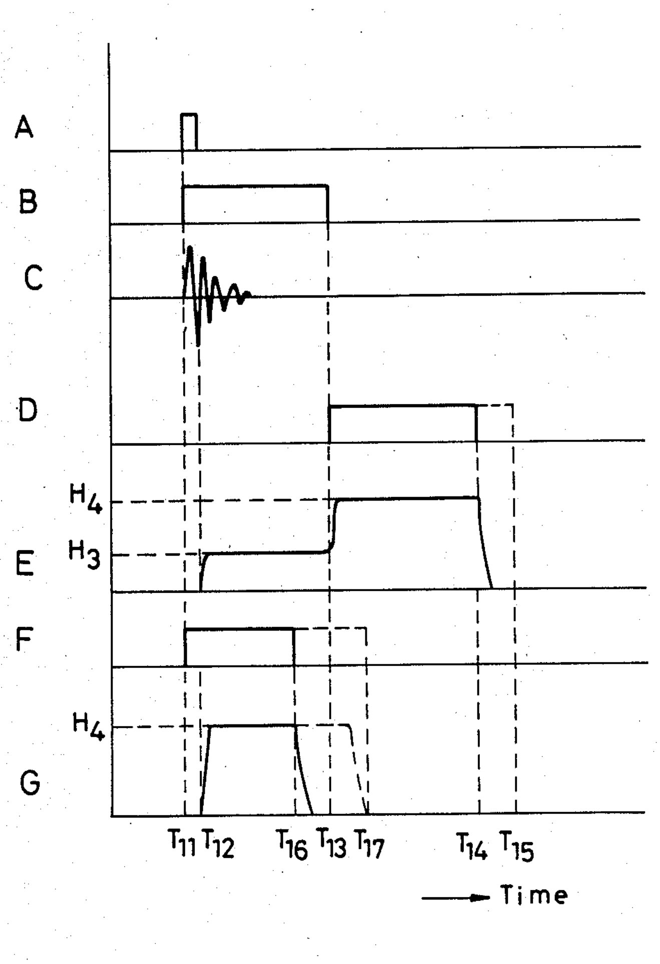
FIG. 9 is a timing chart showing the operation of the third embodiment in the present invention.

When the switch 62 is switched to the position 62-2, as shown in FIG. 9, that is when the switch 36 was closed at the time $T_{11}$ and the transistor 29 comes to the conductive state, the output of the NAND gate 56 of the second operation control circuit 44 turns to the H level, and the output signal in accordance with the time constant of the capacitor 57 and the resistor 58 is issued as shown in FIG. 9F. The second control voltage generation circuit 42 is operated by the above-mentioned output signal, and the flash tube 14 radiates the flash light with the peak value $H_4$ as shown in FIG. 9E. This flash light is applied to the object, and the reflected light from the object is received by the light receiving part 34. When the sum of the received light reaches the predetermined value at the time $T_{16}$, the resistor 58 is shortcircuited by the light radiation interruption signal of the light receiving part 34, and the output signal which is applied to the second control voltage generation circuit 42 by the NAND gate 59 is interrupted. As a result, the FET 15 becomes nonconductive, and the light radiation is interrupted. The period of the output signal ($T_{15}$-$T_{13}$=$T_{17}$-$T_{11}$) of the NAND gate 59 of the second operation control circuit 44 is adjusted by the time constant of the capacitor 57 and the resistor 58 to be equal to or to exceed the period of the full radiation which the all of the charged electric energy in the main capacitor 1 is consumed for the light radiation in the flash tube 14.

Figure 10:
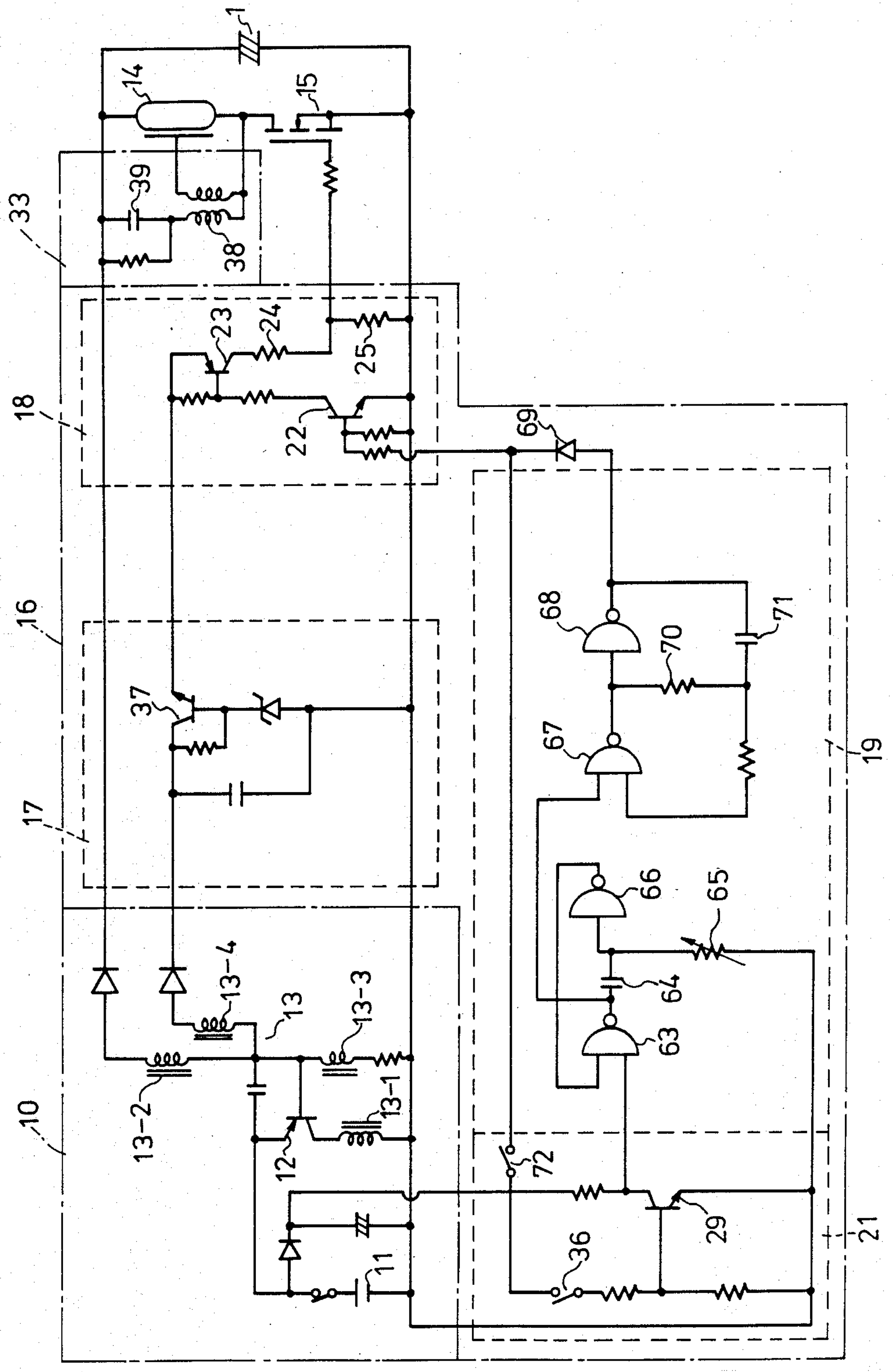
FIG. 10 is a circuit diagram of a fourth embodiment of the present invention showing an electronic flash equipment.
Figure 11:
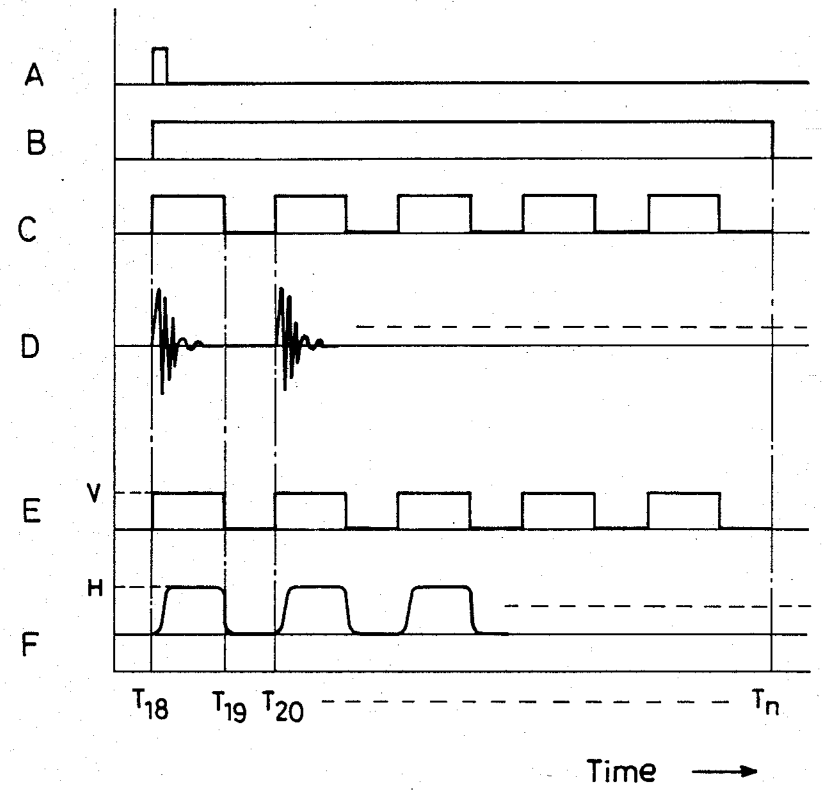
FIG. 11 is a timing chart showing the operation of the fourth embodiment in the present invention.

The fourth embodiment of the present invention is shown in FIG. 10. The multi flash illumination function is provided with this embodiment. In this figure, the circuits numbered the same as FIG. 3 have the same function. The fourth embodiment is elucidated along the timing chart of FIG. 11 as follows. After the power switch of the DC—DC converter 10 is closed, the main capacitor 1 is charged. A constant voltage is issued at the emitter of the transistor 37 by the operation of the constant voltage generation circuit 17 with the Zener diode. In this state, if the illumination for the object is very dark and the focusing of a camera was difficult, the transistor 29 is made conductive by the close of the switch 36 at the time $T_{18}$ as shown in FIG. 11A. As a result, the input terminal of the NAND gate 63 which is connected to the transistor 29 becomes L level, and the output terminal of an NAND gate 63 issues the H level signal.

The period $T_n$-$T_{18}$ of the H level output of the NAND gate 63 is based on the time constant of the capacitor 64 and the resistor 65. When the voltage across the both terminals of the resistor 65 becomes zero by the full charge of the capacitor 64, the output of the NAND gate 66 turns to H level, and the output of the NAND gate 63 turns to L level.

The period $T_n$-$T_{18}$ is changeable freely by the change of the time constant of the capacitor 64 and resistor 65. Since the H level output of the NAND gate 63 is applied to one of the input terminals of the NAND gate 67, the oscillation circuit of the NAND gate 67 and 68 oscillate the signal as shown in FIG. 11C. The periodic time is adjusted by the resistor 70 and capacitor 71. The oscillation continues during the H level period $T_n$-$T_{18}$ of the NAND gate 63.

The output of the oscillation circuit, as shown in FIG. 11C, is applied to the transistor 22 of the control voltage generation circuit 18 through the diode 69, and the transistor 22 turns to conductive state. Furthermore, the transistor 23 turns to conductive state, and the voltage in accordance with the ratio of the resistor 24 and 25 issues across of the resistor 25, and is applied to the gate and the source of the FET 15 as shown in FIG. 11E. The FET 15 thereby turns to conductive state. As a result, electric current flows through the trigger capacitor 39 and the primary coil of the trigger transformer 38 of the trigger circuit 33, and the high voltage trigger output is issued from the secondary coil of the trigger transformer 38 at the time $T_{18}$ as shown in FIG. 11D. This trigger output is applied to the flash tube 14. The flash tube 14 is excited at the same time or after a little time lag from the trigger output, and radiates the flash light consuming the charged electric energy of the capacitor 1. When the output of the NAND gate 68 turned on L level as shown in FIG. 11C, since the voltage across the both terminals of the resistor 25 falls to zero, the FET 15 turns to nonconductive state and the light radiation is interrupted. When the output of the NAND gate 68 turns again to H level at the time $T_{20}$, the flash tube 14 radiates the light again. The above-mentioned operation is repeated and the flash tube 14 radiates the light cyclically until the output of the NAND gate 63 turns to L and the oscillation output of the NAND gate 68 stops at the time $T_n$.

After the focusing is carried out under the illumination of the cyclic repeating flash light, the switch 36 opened. When the switch 72, which was synchronized to the movement of the shutter of the camera closed during the state when the capacitor 1 was fully charged, both transistors 22, 23 turn to conductive state and the FET 15 also turns to conductive state, thus the flash tube 14 radiates the flash light. Since the switch 72 is closed to give the base input voltage for the transistor 22, this switch 72 can be disposed at the other circuit as well as at the trigger switch circuit 21.

Figure 12:
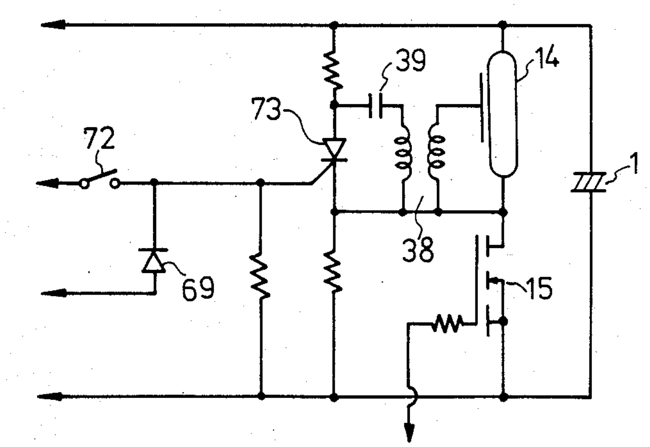
FIG. 12 is a partial circuit diagram of the present invention showing a fifth embodiment of the electronic flash equipment.

The fifth embodiment of the present invention is shown in FIG. 12. The partial circuit diagram, which is different from the forth embodiment, is drawn in FIG. 12. The trigger circuit 33 in the fourth embodiment is operated by turning to conductive state of the FET 15 as shown in FIG. 10. However, in this embodiment, as shown in FIG. 12, the charge of previously charged trigger capacitor 39 is discharged through the primary coil of the trigger transformer 38 by turning to conductive state of the semiconductor switch such as thyristor 73 or the like which is triggered by the output of the NAND gate 68 through the diode 69 or is triggered by the switch 72, thereby the flash tube 14 is excited.

Figure 13:
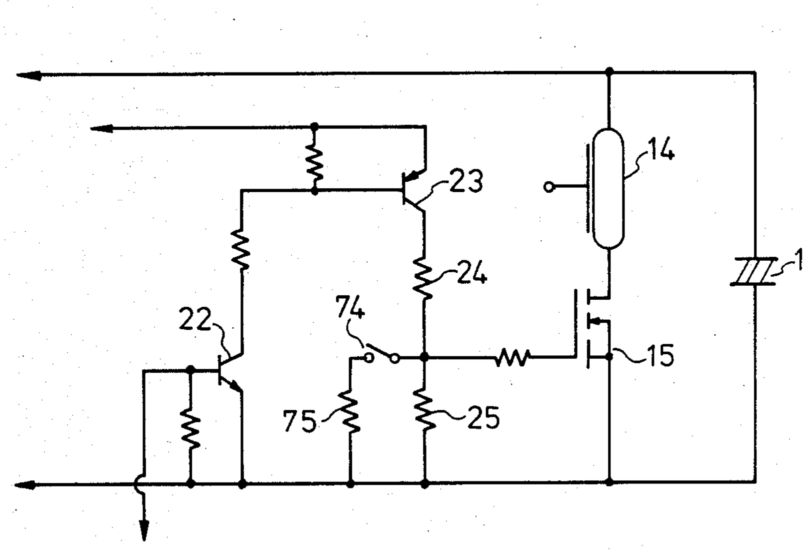
FIG. 13 is a partial circuit diagram of the present invention showing a sixth embodiment of the electronic flash equipment.
Figure 14:
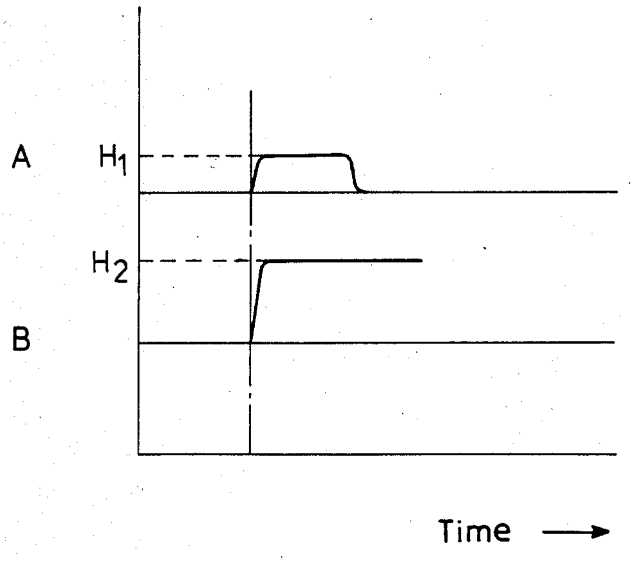
FIG. 14 is a timing chart showing the operation of the sixth embodiment.

The sixth embodiment of the present invention is shown in FIG. 13. The partial circuit diagram which is different from the fourth embodiment is shown in this drawing. A switch 74 which is linked to the trigger switch 36 is provided with the control voltage generation circuit, when the trigger switch 36 of the trigger switch circuit 21 closed, the switch 74 is closed simultaneously. Furthermore, the resistor 75 is connected to the resistor 25 in parallel through the switch 74, in the state that the trigger switch 74 is closed, the resistor 75 is connected to the resistor 25 in parallel, the applied voltage across the gate and the source of the FET 15 decreases. In the state that the trigger switch 74 is open, the applied voltage across the gate and the source of the FET 15 increases. Since the cyclic repeating flash light radiation purposes to adjust the focusing, the lower light peak value $H_1$ is enough to observe the object, as shown in FIG. 14A. The flash light with the higher light peak value $H_2$ is radiated in order to take a photography as shown in FIG. 14B.

In the above-mentioned fourth, fifth and sixth embodiments, the automatic light control function is adaptable to these embodiments by addition of the light receiving part 34, the light receiving device 35 and the control operation interruption circuit 20 of the first embodiment. As the substantial means, the collector and the emitter of the transistor 32 are connected to the base and the emitter of the transistor 22 of the control voltage generation circuit 18, respectively, or are connected to the gate and the source of the FET 15, respectively.

The electronic flash equipment in the present invention uses the FET which is connected to the flash tube 14 in series and is controlled by the voltage control means 16 as the switching device. The features of the embodiments of the present invention are as follows:

1. The turn off circuit which is necessary in the conventional flash equipment using the SCR is unnecessary in the present invention, and therefore, the surplus light after the turn off of the SCR is not radiated.

2. In case that the high sensitivity film is used to take a photograph of an especially near object, the light radiation period of the conventional flash equipment is made to be very short, for example 0.1–0.5 m sec, by the automatic light control function. As a result, the sensitivity of the film is decreased by the well known reciprocity low failure. However, in the present invention, the peak value of the light intensity of the flash tube is adjustable by the control of the voltage which is applied to the gate of the FET. Therefore, in the above-mentioned case, the peak value of the light intensity is suppressed and the light radiating time is expanded. In the second and third embodiments of the present invention, the peak value of the light intensity is made to be low in the early period and is made to be high in the latter half of the flash light radiation. As a result, the peak value of the light intensity is lower in a range of the short radiation time, and is higher in a range of the long radiation time as shown in FIG. 7. Therefore, the adequate light is applied to the object of the various distances and the problem of the reciprocity low failure is solved in the present invention.

3. The period of the flash light radiation in the conventional equipment is about 1 m sec in a full light radiation. In the camera having the focal plane shutter, the synchronization between the shutter running and the flash eight radiation is possible in comparatively a low shutter speed, for example under one sixtieth of a second.

In the present invention, since the period of the flash light radiation is easily expanded to 3 or 4 m sec by the aforementioned method, the synchronization at the high speed shutter (short exposure time), for example 1/125 or 1/250 sec, is possible.

4. In the third embodiment, the first light radiation mode, in which the light peak value is low in an early period and is high in a latter half and the second light radiation mode which the light peak value is high from the start are freely selected. Therefore, either of the two modes are selected according to the sensitivity of the film.

5. In the flash light equipment of the present invention, the turn off circuit using in the switch device of the conventional flash equipment is unnecessary, since the FET is adopted as a switching element. Since the FET has a high frequency response characteristics, high frequency repeating of the flash light radiation is possible.

6. Furthermore, in case that the illumination light is short for focusing and the repeating flashing is used to illuminate the object, the flash light equipment in the present invention can radiate the repeating flash without a subcápacitor. Therefore, the adjustment of the capacitance of the subcapacitor and an operation frequency of the trigger circuit is unnecessary.

7. The repeating flash light is radiated by consumption of the electric energy which is previously fully charged in the main capacitor. Therefore, the shortage of the light intensity by an insufficient charge of the main capacitor, for instance by using a consumed battery, does not occur.

What is claimed is:

1. An electronic flash equipment device operating from a power source, comprising:

a main capacitor charged by electric energy from the power source;

a flash tube for radiating a flash light by consumption of said electric energy in said main capacitor;

a trigger circuit for exciting said flash tube;

a field effect transistor, directly series connected to said main capacitor, and having its drain and source connected in series between said main capacitor and said flash tube, respecively, to control a discharging current flowing through said flash tube; and voltage control means for controlling an operation of said field effect transistor by controlling a voltage to be applied to a gate of said field effect transistor, comprising:

(a) a voltage regulator means for stabilizing an output voltage of the power source, (b) dividing means for dividing said output voltage of said voltage regulator means, (c) switching means for applying an output of said voltage regulator means to said dividing means in response to an applied signal, (d) operation control means for operating said switching means for a predetermined period of time, (e) a trigger switch circuit for triggering said operation control means, and (f) control operation interruption means for stopping said signal to said switching means.

2. An electronic flash equipment in accordance with claim 1 further comprising:

a light receiving part for detecting a reflected light from an object, and for issuing a light radiation interruption signal to said control operation interruption means when an amount of light detected by said light receiving part reaches a predetermined value.

3. An electronic flash equipment in accordance with claim 1, wherein said trigger circuit is coupled to said trigger switch circuit.

4. An electronic flash equipment in accordance with claim 1, wherein said dividing means includes means for changing a dividing ratio thereof.

5. An electronic flash equipment in accordance with claim 2, wherein said operation control means issues pulse signals which are generated with a predetermined periodic time and pulse width by a triggering of said trigger switch circuit.

6. An electronic flash equipment in accordance with claim 2, wherein said control voltage generation means comprises a plurality of voltage dividing means, each having different dividing ratios, and a plurality of switch means for controlling a connection between said plurality of switch means and said voltage regulator means, and said operation control means comprises a pulse generator which generates a plurality of pulse signals with predetermined time widths, and said plural pulse signals are applied to said switch means when said operation control means is triggered by said trigger switch circuit, ones of said plurality of signals which are different voltage are applied across a gate and a source of said transistor in turn.

7. An electronic flash equipment in accordance with claim 2, wherein said control voltage generation means comprises plural dividing means having different dividing ratios and plural switch means which control a connection between said plural dividing means and said voltage regulator means, said operation control means comprises plural pulse generators which issue pulse signals, each with a predetermined pulse width, and said trigger switch circuit comprises a switch for selecting one of a first operation mode which said plural pulse generators are operated in turn and a second operation mode which one of said plural pulse generators is selected.

8. An electronic flash device which operates from a source of stored high voltage power to operate a flash tube, comprising:

main capacitor means charged by electric energy from the power source;

means for commanding a triggering of said flash tube, and producing a command trigger signal output;

a field effect transistor, directly series connected to said main capacitor, and having its drain and source coupled in series between said flash tube and said main capacitor means, respectively, for selectively providing an electrical conduction path between said flash tube and said main capacitor means;

control voltage means, coupled to said command trigger signal output, for producing a control signal for said field effect transistor to control said conduction path being provided, said control signal being coupled to a gate of said field effect transistor;

means for detecting light emitted by said flash tube, and producing a light detect signal when a predetermined amount of light is detected; and timing means for controlling a timing of said control signal, said timing means coupled to receive said light detect signal, and terminating said control signal when said light detect signal is produced.

9. An apparatus as in claim 8 further comprising triggering means, coupled to said field effect transistor, for triggering said flash tube when said field effect transistor is in a conducting state.

10. An apparatus as in claim 8 wherein said timing means includes an RC network with a resistor and a capacitor, for controlling a timing of said control signal based on a time constant of said RC network, and wherein said means for detecting light includes means for short circuiting across said resistor of said RC network so that said time constant approaches zero, to terminate said control signal.

11. An apparatus as in claim 9 wherein said control voltage means produces two control signals of different voltage levels, and said timing means controls the timing of said two control signals.

12. An apparatus as in claim 11 wherein said timing means controls the timing of said two signals so that a first signal of a lower voltage is produced for a first time, followed by a second signal of a higher voltage produced for a second time.

13. An apparatus as in claim 10 wherein said control voltage means produces two control signals of different voltage levels, and said timing means controls the timing of said two control signals.

14. A device according to claim 1 wherein said trigger circuit is triggered by an ON signal from said field effect transistor.

15. Electric flash equipment apparatus operating from a power source, comprising:

a main capacitor charged by an electric energy from said power source;

a flash tube for radiating a flash of light by consumption of said electric energy stored in said main capacitor;

a trigger circuit for exciting said flash tube;

a field effect transistor, directly series connected to said main capacitor, and having its drain and source connected in series between said main capacitor and said flash tube respectively, to control a discharging current flowing through said flash tube; and voltage control means for controlling an operation of said field effect transistor by controlling a voltage applied to a gate of said field effect transistor including:

(a) voltage regulator means for stabilizing an output voltage of said power source, (b) dividing means for dividing said output voltage of said voltage regulator means, (c) a first dividing circuit for dividing said output voltage of said voltage regulator means, and for supplying a first voltage from said first dividing circuit to said gate of said field effect transistor, (d) a second dividing circuit for dividing said output voltage of said voltage regulator means, and for supplying a second voltage from said second dividing circuit to said gate of said field effect transistor, (e) first switching means for applying said output voltage of said voltage regulator means to said first dividing circuit, (f) second switching means for applying said output voltage of said voltage regulator means to said second dividing circuit, (g) a first operation control circuit for operating said first switching circuit for a first predetermined period of time, (h) a trigger switch circuit for triggering said first operation control circuit, (i) a second operation control circuit for operating said second switching circuit for a second predetermined period, said operation control circuit being coupled to an output of said first operation control circuit and being set by said trigger switch circuit when said first operation control circuit is stopped, and (j) a control operation interruption circuit for stopping a signal to one of said first and second switching circuits.

16. A device according to claim 15 further including a light receiving part for detecting a reflected light from an object, and for issuing a light radiation interruption signal to said control operation interruption circuit when an amount of light which is detected by said light receiving part reaches a predetermined value.

17. A device according to claim 15 wherein said trigger circuit is coupled to said trigger switch circuit.

18. A device according to claim 15 wherein said trigger circuit is operated by an ON signal supplied from said field effect transistor.

19. A device according to claim 15 further including a switch, disposed on said trigger switch circuit, for stopping a trigger signal from said trigger switching circuit, and for supplying said trigger signal to said second operation control circuit.

20. An electronic flash equipment device operating from a power source, comprising:

a main capacitor charged by electric energy from said power source;

a flash tube for radiating a flash of light by consumption of said electric energy stored in said main capacitor;

a trigger circuit for exciting said flash tube;

a field effect transistor, directly series connected to said main capacitor, and having its drain and source connected in series between said main capacitor and said flash tube, respectively, to control a discharging current flowing through said flash tube, and voltage control means for controlling an operation of said field effect transistor by controlling a voltage to be applied to a gate of said field effect transistor, including:

(a) voltage regulator means for stabilizing an output voltage of said power source, (b) dividing means, coupled to said gate of said field effect transistor, for dividing said output voltage of said voltage regulator means, (c) switching means for applying an output of said voltage regulator means to said dividing means, (d) operation control means for operating said switching means for a predetermined period of time, (e) a trigger switch circuit for triggering said operation control circuit, and (f) control operation interruption means for stopping a signal to said switching means.

21. An apparatus as in claim 14 further comprising means for selecting between either an operation using said two levels of control signals or an operation using a one level control signal.

22. An apparatus as in claim 13 further comprising means for selecting between either an operation using said two levels of control signals, or an operation using a one level control signal.

* * * * *